Figure 1:
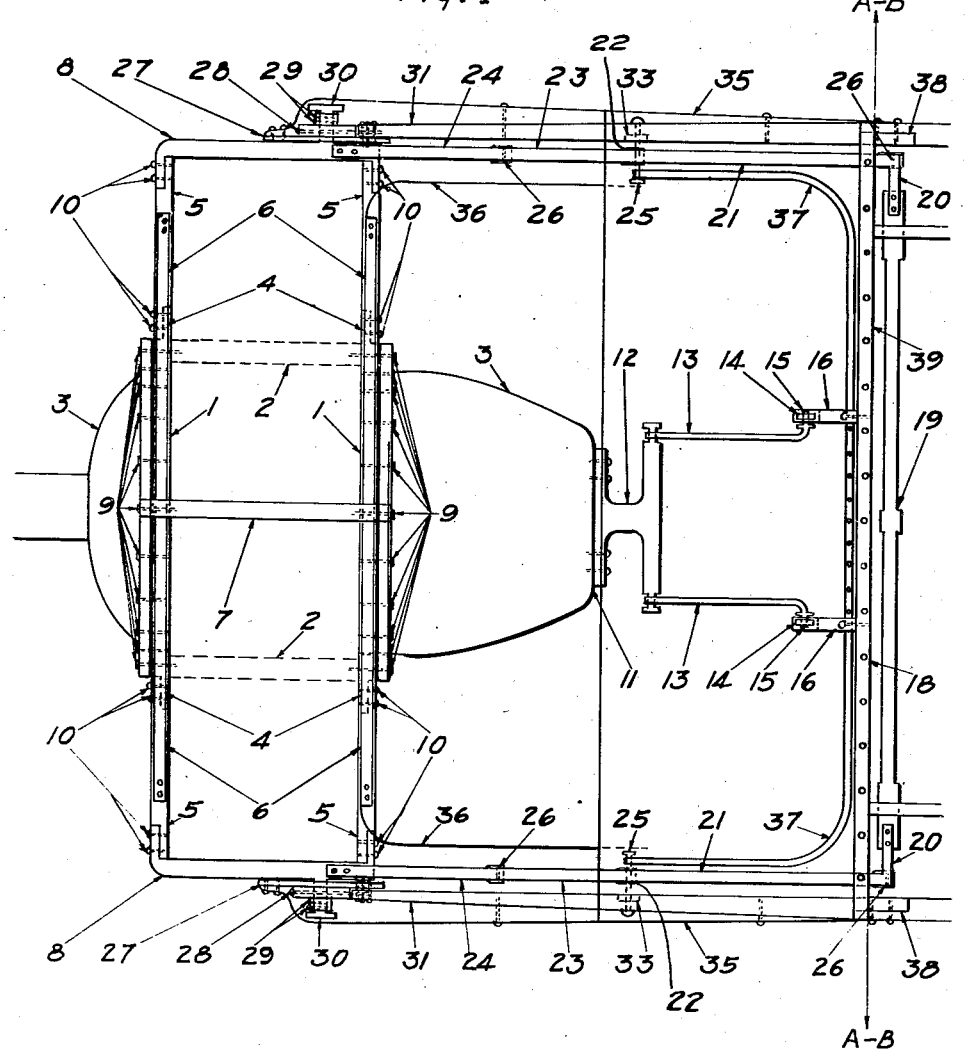

Patented July 28, 1942

2,291,515

UNITED STATES PATENT OFFICE 2,291,515

AIRCRAFT

John Weichwald, Chicago, Ill.

Application November 13, 1939, Serial No. 304,261

3 Claims. (Cl. 244—13)

This invention relates generally to air craft and has particular reference to new and useful improvements in flying machines of the "heavier-than-air" type.

This application is a refile in part of my abandoned application Serial No. 185,904 filed Jan. 20, 1938.

One of the objects of my invention resides in the provision of a flying machine having a fuselage provided with a combined rudder and elevator, a centrally disposed power-driven propeller and a plurality of longitudinally and transversely spaced power-driven propellers but no laterally disposed wings or aerofoils.

Another object of my invention resides in the provision of a novel power-propelled flying machine having a novel construction and arrangement of members and parts whereby the required pendulous stability is provided to insure the necessary equilibrium of the machine during its ascent, flight, and descent. Among the novel features contributing to the pendulous stability through which the equilibrium of the craft is attained are:

(a) Fuselage design having an enlarged or extended body portion extending substantially below the longitudinal axis of the fuselage;

(b) The upper portion of the fuselage being constructed of comparatively light weight material and the lower portion of the fuselage being weighted and constructed of considerably heavier materials to substantially increase the weight of the fuselage below its longitudinal axis so that the center of gravity is substantially lowered to provide the desired flight-sustaining equilibrium of the body;

(c) The provision of storage tanks for the oil and fuel or gasoline within the extended weighted lower portion of the fuselage;

(d) The extended elevator planes;

(e) The plurality of longitudinally aligned and transversely spaced pairs of motors.

With the above and other objects in view, my invention consists in the novel construction and arrangement of the parts and members shown in preferred embodiment in the attached drawings, described in the following specification, and particularly pointed out in the appended claims.

Figure 2:
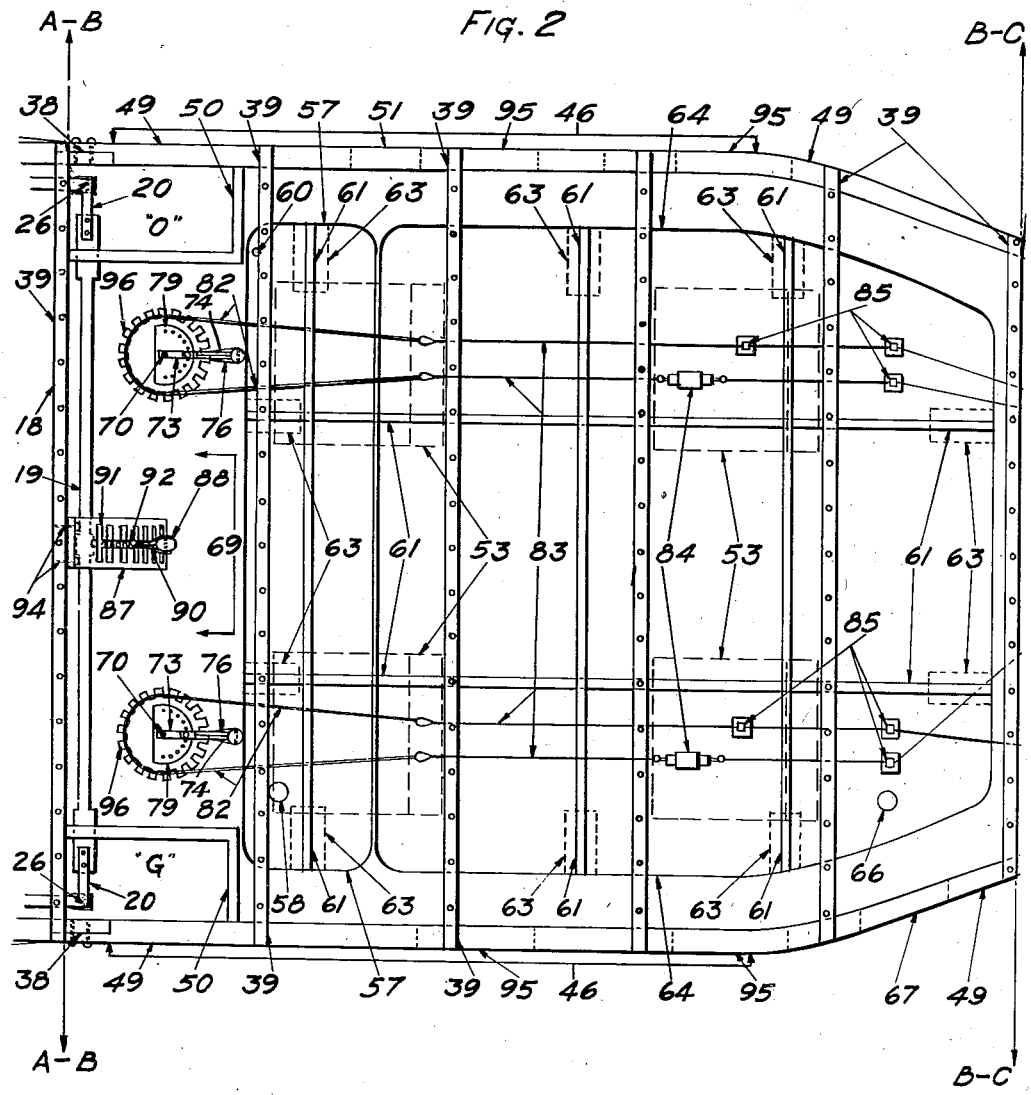
Figure 3:
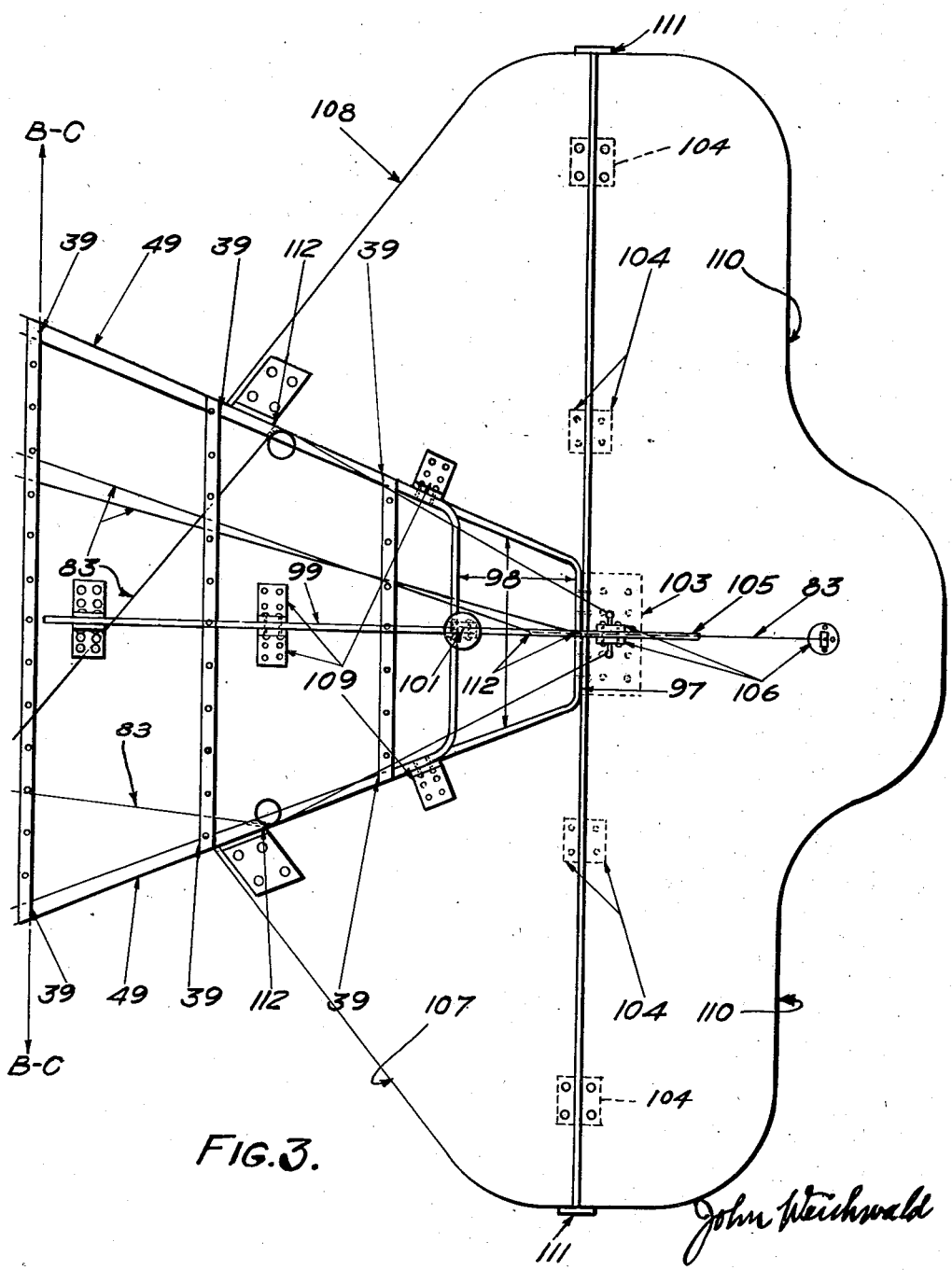
Figure 4:
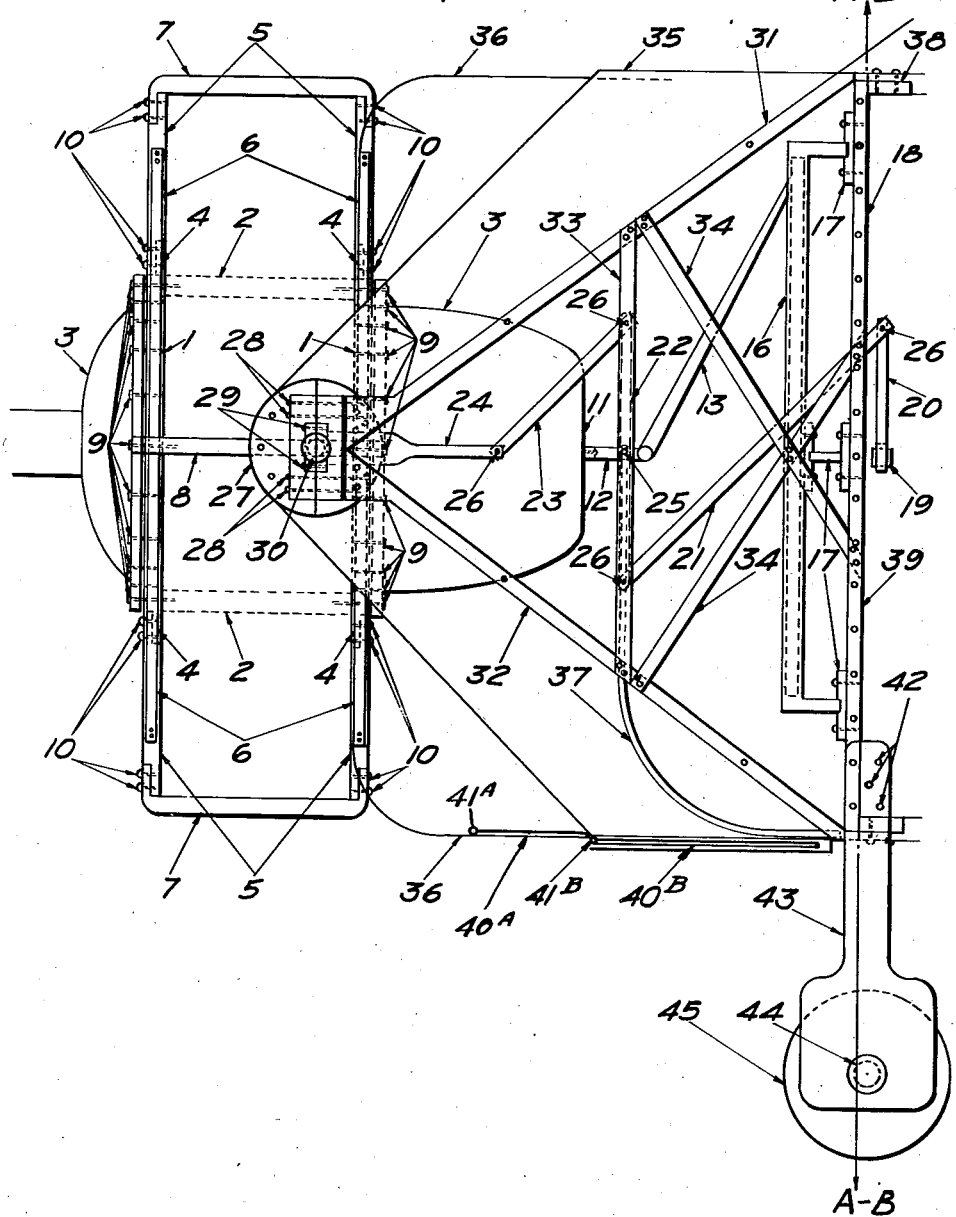
Figure 5:
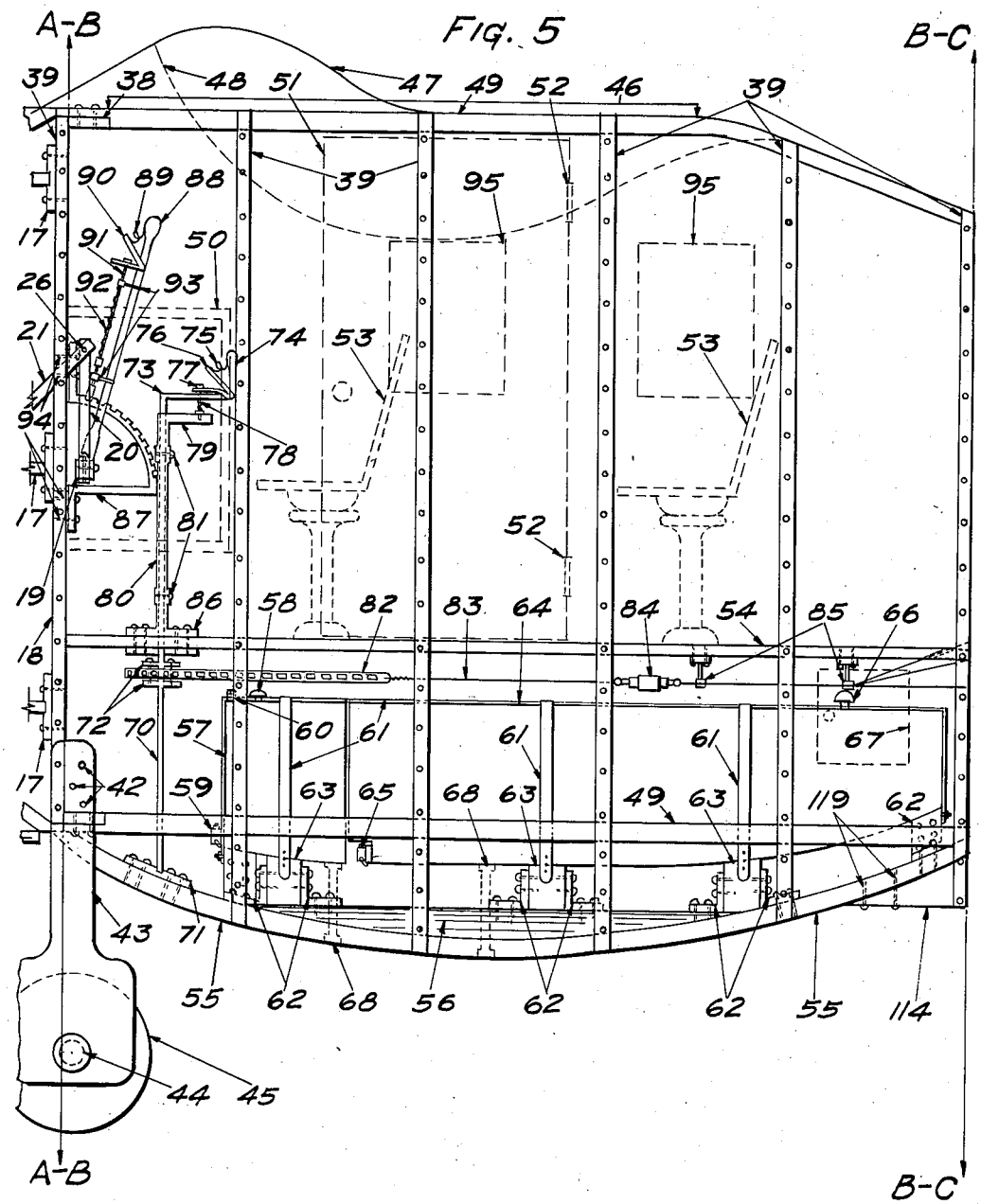
Figure 6:
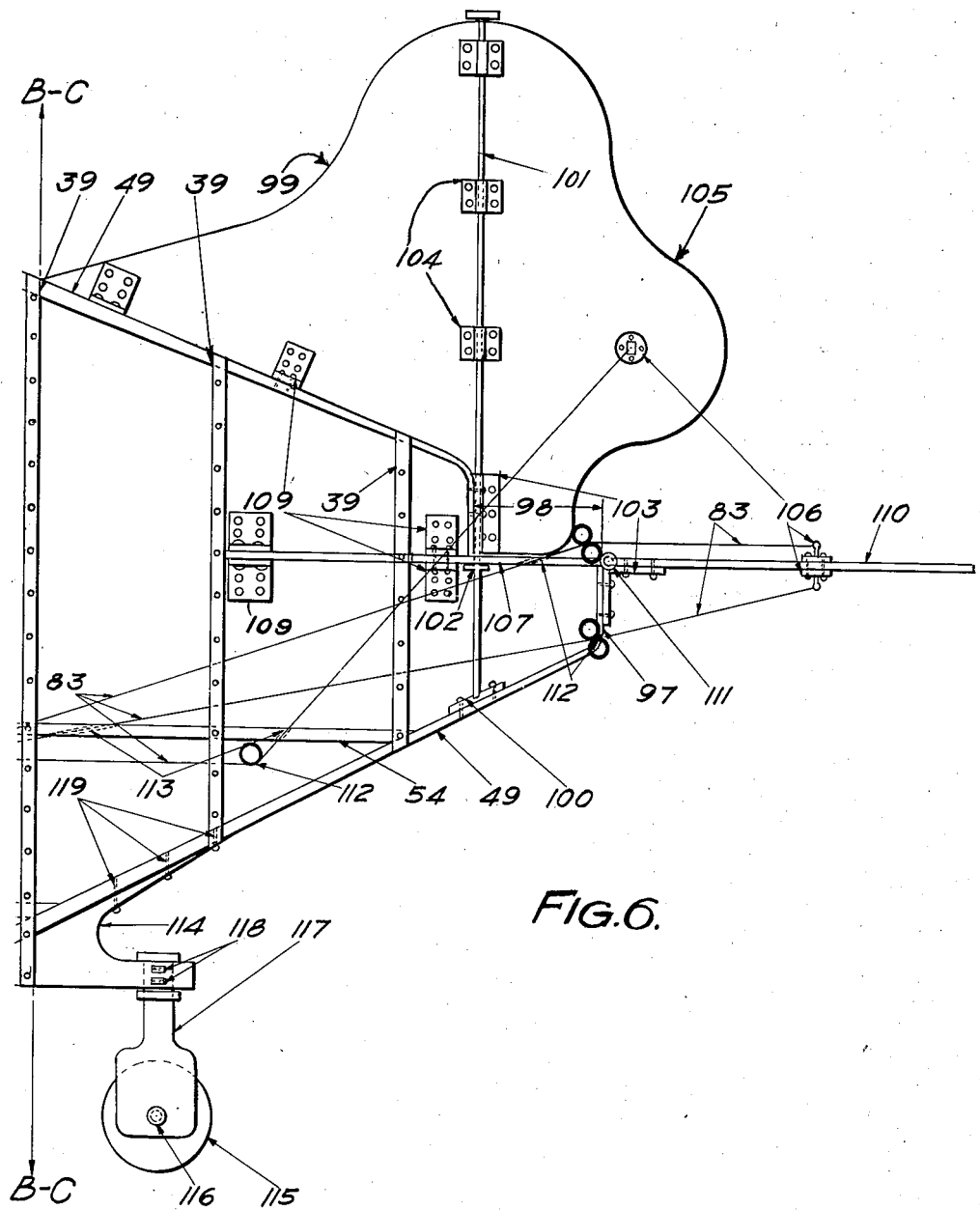
Figure 7:
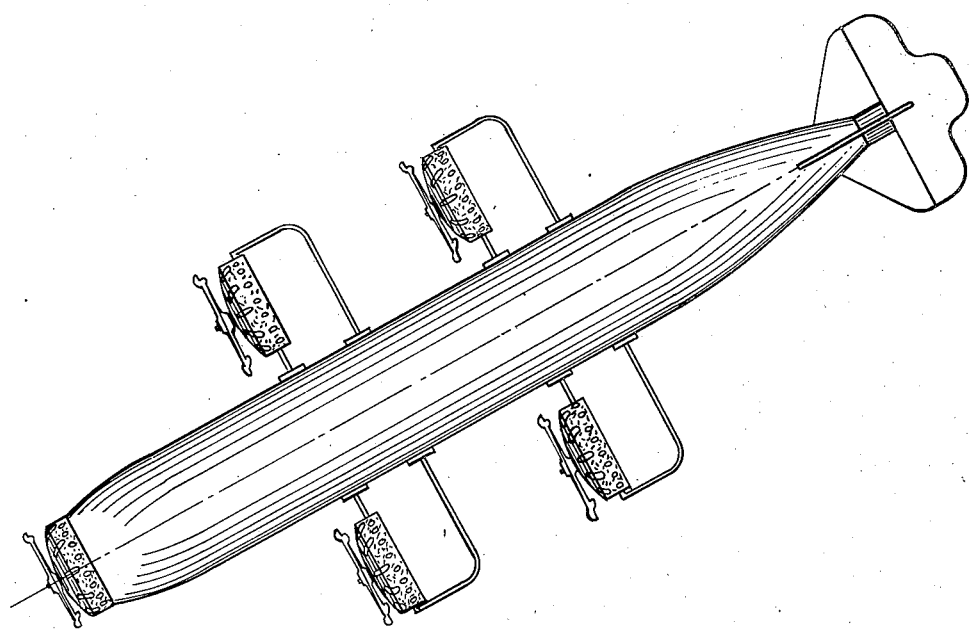

Referring to the drawings:

Figs. 1, 2, and 3 show plan views of sections A, B, and C of the craft, or respectively, the forward or front end portion, the intermediate portion, and the rear portion of the fuselage;

Figs. 4, 5, and 6 are side elevations of sections A, B, and C respectively, shown in Figs. 1, 2, and 3; and Fig. 7 is a plan view of a flying craft or machine embodying my invention.

Referring to Figs. 1 and 4, showing respectively a plan view and side elevation of the front portion, or section A of the craft, the crankcase housing is indicated by numerals 2 and 3 and the motor-supporting swivel frames are indicated by numeral 1.

The two laterally spaced sets of vertical and horizontal cross-bars 5 are connected at their inner ends to the extensions 4 of the swivel frames 1. The two sets of bars 5 are connected together by longitudinally extending connecting members 7 and 8. The swivel frame-supporting structure includes the diagonal braces 6 for the cross-bars 5.

9 indicates studs which extend through the swivel frames 1 and crank case covers. The bolts 10 connect the swivel frame cross-bars 5 with the longitudinal bars 7 and 8.

A bracket 12 is rigidly connected to the rear end 11 of the crank-case housing 3.

The two links 13 are pivotally connected to the bracket 12 and the opposite ends 15 of these links are formed into right-angularly disposed short ends positioned in ball-bearing rollers 14 which are adapted to ride up and down within the channeled guide rails 16 which are suitably held in fixed position on the supports 17 and 18.

The front motor tilting mechanism includes a horizontal shaft 19 having a pair of vertically disposed end members 20 pivotally connected by pins 26 to the upper ends of the links 21. The lower ends of links 21 are pivotally connected by pins 26 to the lower ends of the vertically disposed rocker arms 22 which are pivotally supported on pins 25.

The upper ends of the rocker arms 22 are pivotally connected by pins 26 with the upper ends of the links 23 the lower ends of which are pivotally connected to the outer ends of the arms 24.

The front ends of arms 24 are securely fastened to the members 8. The two side members 8 are provided with pivot pins 30 which are pivotally mounted in the flanged bearings 27 and bolts 28 and 29 secure the bearings 27 to the centrally converging end of the craft housing 35.

The pivotal supports 30 are reenforced by the angularly disposed structural braces 31 and 32 and these braces 31 and 32 are connected by rigid braces 33 and 34 and secured by bolts 38 to the cross partition 39. The closure head or housing for the open end of the craft body is indicated by 36.

As an additional support for the pivot pins 25, I provide a pair of rigid bars 37 which are secured to the bottom of the craft and extend in curved form upwardly along the sides of the craft housing up to the pivotal pins 25.

In order to maintain a closure at the lower or bottom end of the closure head or housing for the open end of the craft body during the upward tilting of the motor about the pivots 30, the motor housing 36 is provided with a pair of hingedly connected closure sections 40A and 40B which are provided with hinges at 41 A and 41B.

The ground or landing wheels 45 are pivoted at 44 upon the legs 43 which are secured by bolts 42 to the craft structure.

Referring now to Figs. 2 and 5 which show respectively a plan view and side elevation of the central or intermediate section of the craft indicated as B, the body portion 46 includes the structural reenforcing members 39 which extend vertically of the body sides and transversely of the body.

The side extensions 50 of the instrument board enclose the oil feed tank O and the gasoline feed tank G. The broken lines 51, 52, and 53 indicate respectively the door, its hinges, and the operators' seats.

To insure pendulous stability the bottom of the craft is extended in curved form, as at 55, and weighted as indicated at 56 with a mass of concrete or steel to lower the center of gravity below the longitudinal axis of the craft body.

As additional means for lowering the center of gravity to thereby insure the pendulous stability of the craft, there are provided below the craft floor 54, storage tanks for oil and gasoline, respectively, indicated by numerals 57 and 64.

The oil storage tank 57 is provided with an oil inlet 58, an outlet connection 59, and a connection 60 for an overflow pipe.

Suitable steel straps 61 secure the oil tank 57 and gasoline storage tank 64 to the supporting wood blocks 63 which are secured to the craft structure by angle irons 62.

The main gasoline storage tank 64 is provided with an inlet closure cup 66 and an outlet connection 65. The craft body has a suitable door to provide access to the tank inlet as indicated by the broken lines 67. The tank 64 is also provided with steel straps 61 which are secured to the woods blocks 63 which are held in place by the angle irons 62.

The oil and gasoline tanks are provided with drains indicated by 68.

The control pit is indicated by 69, see Fig. 2.

The two vertically disposed rudder control shafts 70 are supported at their lower ends in suitable bearings 71 and their upper ends are provided with right-angularly bent integral portions 73 terminating in pivoted handles 74.

The shafts 70 are mounted in supporting split housings 80 secured together by bolts 81 and having floor flanges 86 which are riveted to the floor 54. Each operating handle 74 is provided with a triangular lock-pin operator 76 pivoted to the handle 74 and which is adapted to be gripped with the handle 74 to raise the lock-pin 77, against the pressure of the coil spring 78, out of one of the circularly arranged holes in the semicircular plate portion 79 at the top of the housing 80 to release the handle 74 for rudder-operating movement. A leaf spring 75 is mounted between the operator lever 76 and the handle 74 to normally retain the operator lever in locked position.

Each shaft 70 is provided with a sprocket 96 keyed thereto and positioned between the pair of circular collars 72 formed integrally with the shaft 70.

Trained around each sprocket 96 is a sprocket chain or perforated steel band 82 and to the ends of which are connected the wire ropes 83 for operating the rudders 105 and 110.

Tension adjusting turnblocks 84 are provided for the operating wire ropes 83. The operating ropes 83 are guided in suitable pivoted guides 85.

The front motor-tilting operating lever 88 is connected to the operating shaft 19 whereby same is rotated on the support 87 to cause a tilting of the front motor through the two sets of parts 20, 21, 22, 23, and 24. The motor rear-end guiding and tilting means is indicated by reference numerals 12 to 16 inclusive.

The operating handle 88 is provided with lockrod 91 which is mounted in guides 93 and the lower end of the lock-rod 91 is adapted to be seated between any pair of the teeth on the quadrant 87 to retain the lever 88 and motor in the selected tilted position.

The lock-rod 91 is normally retained in locked position by coil spring 92. The lock-rod triangular operating lever 90 is pivoted on the handle 88 and normally retained in locked position by the bent leaf spring 89. To release the lock-rod 91 handle 88 and lever 90 are grasped in hand so that lever 90 is moved against the pressures of the springs 89 and 92 to move the end of lockrod 91 out of locked position with quadrant 87. The quadrant is secured by bolts 94 to the instrument board.

Windows are indicated by broken lines 95.

In Fig. 5 the preferable type of closed body is indicated by 47 and the open type of body is indicated by 48.

Even if all gasoline and oil were consumed, the craft body is so designed that its center of gravity is still substantially below the longitudinal axis of the body.

Referring now particularly to Figs. 3 and 6 which show respectively plan view and elevation of the rear end or section C of the craft, the rear end 97 is provided with an upper recessed portion 98 and a vertical stationary rudder portion 99 is secured to the top of the rear end craft body by angle irons 109.

The vertical movable rudder portion 105 is hingedly supported on the hinge rod 101 and hinge plates 104 secured to the stationary vertical rudder portion 99. The hinge rod 101 is supported at its lower end in a suitable bearing 100.

The stationary and movable rudder portions extend a substantial distance above the top of the craft body.

The vertical movable rudder portion 105 is also supported on comparatively heavy hinges 103 connected to the craft recessed end above the shoulder 102 of the rod 101.

The combined stabilizing horizontal rudder, aerofoil and elevator 110 includes a pair of lateral stationary wings or aerofoils 107 and 108 which are suitably secured to the side of the craft body as by angle irons 109.

The hinge shaft 111 is provided with a heavy central hinge 103 and side hinges 104 which are secured to the horizontal stationary stabilizing wings 107 and 108 and to the movable horizontal elevator and stabilizer 110.

The lateral lateral stationary wings 107 and 108 and the movable horizontal elevator 110 are disposed in a horizontal plane which coincides with the longitudinal center-line of the craft body which passes through the longitudinal center-line of the front or central propeller shaft. The wings 107 and 108 extend forwardly of the craft body and transversely beyond the sides of the craft body.

The rudder-operating cables or ropes 83 extend through the floor openings 113 and body openings 112 for connection to the rudder connectors 106, as shown in Figs. 3 and 6.

The rear end running gear or wheel 115 is mounted on the axle 116 supported in the rotatable leg 117 which is secured as at 118 to the bracket 114 connected by rivets or bolts 119 to the craft framework.

The craft herein disclosed is provided with a plurality of propellers driven by individual motors. One central motor is provided at the front end of the body and two or more motors are provided on each side of the body. All of the motors are mounted on tiltable supports which are similar in construction to that of the front or central motor. Any suitable type of motor may be used but I prefer the radially disposed piston type. The motors may be arranged to be tilted simultaneously or individually controlled for independent tilting operation. Any suitable means for controlling the flow of the fuel through suitable carburetors may be provided.

The pivots for all propeller motors are disposed on a horizontal plane which passes through the longitudinal center-line of the front or central propeller shaft.

As shown in the drawings, and referring particularly to Fig. 2, the vertical and horizontal movable rudder portions are independently controlled by the two control handles 74. The upper one of the handles 74, as shown in Fig. 2, controls the movable horizontal rudder portion and the lower one of the handles 74 controls the movable vertical rudder portion.

Various changes and modifications in the details of construction shown in the attached drawings by way of example may be made by those skilled in the art without departing from the spirit of my invention defined in the appended claims.

It is to be understood that I do not intend to abandon any of my rights for various novel features shown herein and in my former abandoned application Serial No. 185,904 filed January 20, 1938, but not claimed herein as separate applications for such novel features may be filed later. It is my intention to claim in this application the more important features of my invention.

I claim:

1. In an aircraft, a body having an open front end defined by spaced parallel side walls and spaced parallel top and bottom walls, said side walls having extensions disposed beyond said top and bottom walls, pivotal supports on said side wall extensions, a closure head for the open end of said body, a frame secured to the outer end of said closure head pivotally mounted on said supports, a motor supported on said frame, and means within said body for tilting said motor, frame and closure head about said pivotal supports.

2. In an aircraft as defined in claim 1 and including closure plates hingedly connected to the bottom of said closure head, movable with but relatively to said closure head, and constituting an extensible closure whereby the open end of the body is maintained closed during the upward tilting of the motor, frame and closure head.

3. In an aircraft structure as defined in claim 1 and including said body side walls having relatively converging rear extensions; said body top and bottom walls having relatively converging rear extensions; an upper portion of the rear end of the craft body above the longitudinal axis of the body being recessed to provide a pair of relatively longitudinally and vertically offset upper and lower vertically disposed transverse walls, said upper transverse wall extending above the longitudinal axis of the craft body, said lower transverse wall extending below the longitudinal axis of the craft body; a stationary vertical rudder mounted on the rear portion of said top wall and having a vertical rear edge substantially vertically aligned with said upper transverse wall; a movable vertical rudder, hingedly connected to said stationary vertical rudder, extending into said recessed rear end and above the longitudinal axis of the craft body; a combined horizontal stationary rudder and aerofoil disposed substantially in the plane of the longitudinal axis of the craft body and extending transversely of and beyond the sides of the craft body, said horizontal stationary rudder and aerofoil having plane-aligned extensions extending forwardly of and along the rear portions of said body side walls and the rear edge of said horizontal stationary rudder and aerofoil being substantially in vertical alignment with said lower vertical transverse wall; a normally horizontally disposed tiltable elevator adapted for plane-alignment with said combined horizontal stationary rudder and aerofoil and hingedly connected thereto, said elevator being hinged substantially in the plane of the upper edge of said lower vertical transverse wall to extend rearwardly thereof and beyond the rear end of said movable vertical rudder; means for moving said vertical rudder; and means for tilting said elevator.

JOHN WEICHWALD.